Patented Aug. 4, 1936

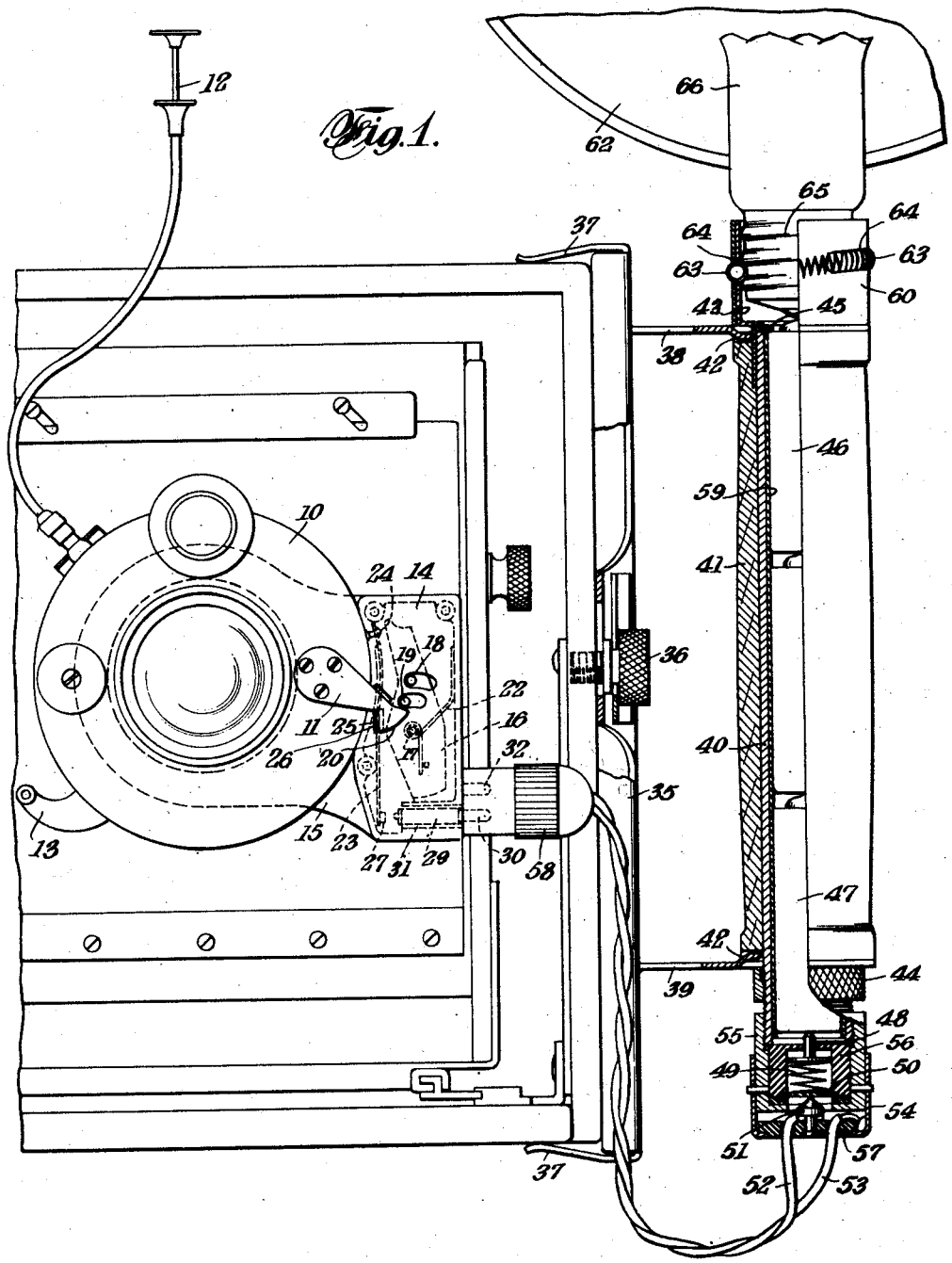

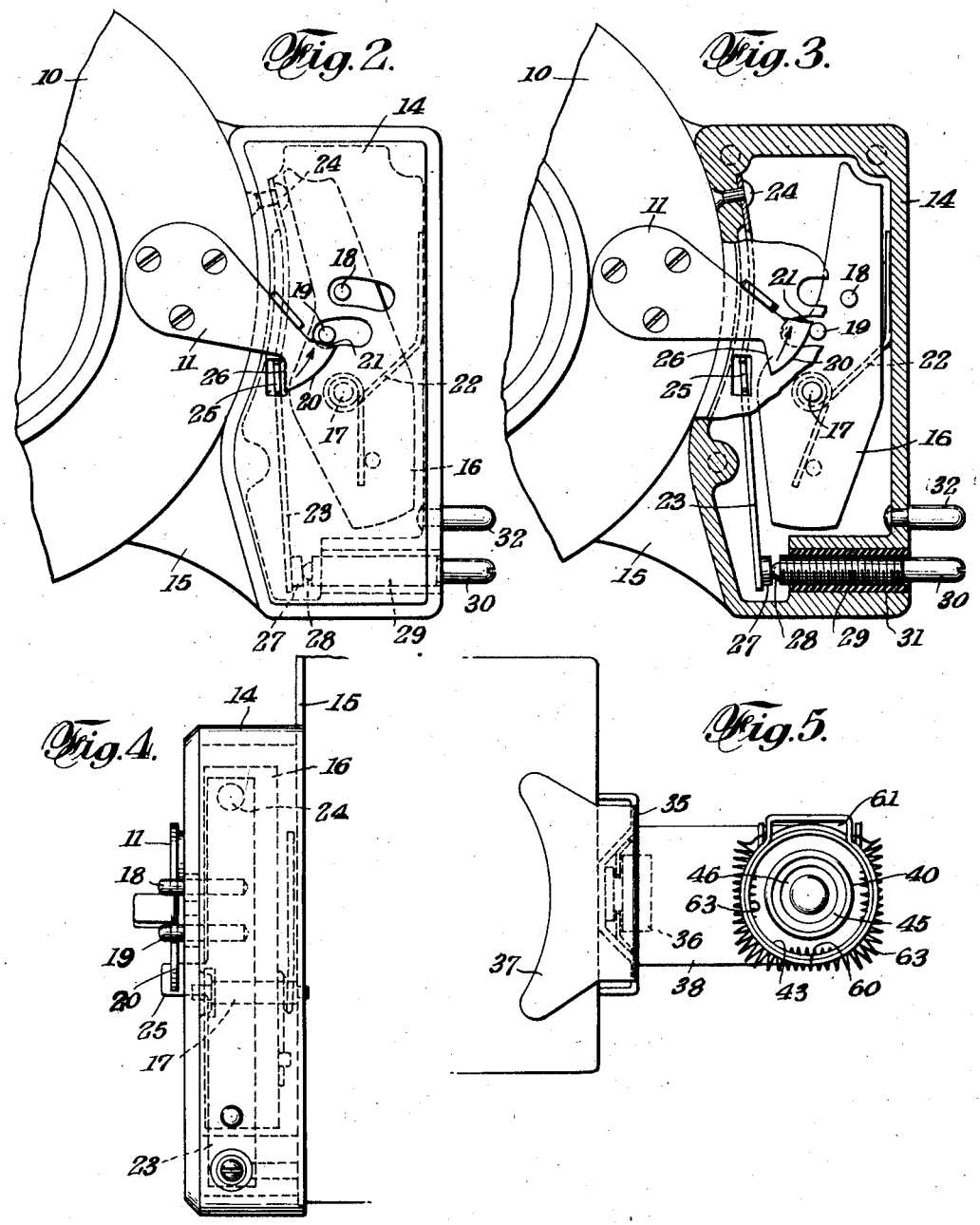

2,049,735

UNITED STATES PATENT OFFICE 2,049,735

COMBINED CAMERA AND FLASH LAMP

Harry Grogin, Brooklyn, N. Y., assignor of one-half to Edward J. Gould, New York, N. Y.

Application November 3, 1934, Serial No. 751,356

6 Claims. (Cl. 67—29)

This invention relates to cameras and more particularly to mechanism for setting off a flash in proper synchronization with the shutter thereof.

While many devices for this purpose have been conceived, they all have been based on the premise that the time interval of the flash was shorter than the duration of the shutter opening, e. g. the patent to Blake, 1,968,597 discloses a structure based on this line of though wherein the shutter is first partially opened, then the flash set off. But since the time interval of the flash is estimated at about 1/75 of a second, it is obvious that the shutter opening must necessarily be of longer duration. Hence the photographing of speed and action by flashlight was well nigh impossible since a shutter speed of 1/200 of a second is usually necessary for good results.

An object of the invention, therefore, is to provide mechanism associated with the shutter of a camera whereby the shutter opens and closes during the flash time interval.

Another object of the invention is to provide mechanical retarding means to arrest the movement of the priming lever to a degree sufficient to permit ignition of the flash lamp before the shutter opens yet permitting the shutter to open before the flash lamp is extinguished.

A further object is to provide a camera in which the shutter retarding means, the flash lamp and the electrical current source (dry cell battery) are all associated in such a manner that only one hand is necessary to support them, the other hand being free to operate the shutter release.

A still further object is to provide the camera with means adapted to house the battery cells and to support the flash lamp and its reflector, and simultaneously affording handle means whereby the camera may be supported with one hand while the other is free to operate the shutter release means.

These and other objects of the invention and the means for their attainment are set forth in the following specification, descriptive of the accompanying drawings, illustrating a preferred form of the invention, and in which:

Fig. 1 is a partial front view of a camera incorporating features of the invention.

Figs. 2 and 3 are detail views showing other positions of the priming lever and its retarding mechanism.

Fig. 4 is a side view of the retarding mechanism in relation to the priming lever, the parts being shown in the position illustrated in Fig. 2.

Fig. 5 is a top view of the detachable handle and battery case.

The shutter mechanism 10 is of the usual type provided with a priming lever 11 and releasing means such as 12 and 13. As is usual in this type of camera, the shutter may not be operated until the priming lever is first cocked. This is done immediately prior to snapping a picture.

The retarding mechanism is enclosed in a casing 14 secured to a plate 15 and held in place by the shutter assembly as shown. A retarding lever 16 is pivoted at 17 in the casing and this retarder is provided with pins 18 and 19 or their equivalents. These pins are arranged to protrude through openings in the casing to be operatively associated with the curved edge 20 and the ledge portion 21 of the priming lever. A torsional spring 22 is employed to normally retain the retarder in the position shown in Figs. 1 and 2.

A contact spring 23 is mounted in the casing at 24 and is provided with a projection 25 which protrudes through the front wall of the casing to be operatively associated with the face 26 of the priming lever. The free end of the contact spring is preferably provided with a contactor 27 adapted to impinge against the end 28 of a screw 29 having a terminal prong 30 protruding from the side of the case. The screw 29 is threadedly engaged in an insulating sleeve 31 fixed in the casing. Another terminal prong 32 is securely fastened to the casing.

Electric current supplied to the prongs 30, 32 would seek the following course,—prong 32, casing 14, spring mount 24, spring 23, contactor 27, screw 29, terminal prong 30, the circuit being at times broken by separation between the contactor 27 and the screw 29.

In order to make the camera easier to handle and also to provide means to house the current supply source and to support the flash lamp and its reflector, a bracket 35 is removably fixed to a side wall of the camera as by means of the thumb screw 36, and to steady the bracket on the camera, inreaching fingers 37 on the bracket are arranged to engage the top and bottom walls of the camera.

The bracket is formed with an outstanding arm 38 near its top and with a similar arm 39 spaced from the bottom. These two arms are each provided with an opening at the end through which passes a metal tube 40. Surrounding the tube 40 and confined between the bracket arms 38 and 39 there is provided a handle 41, preferably of hardwood or other electrical non-conductor, means such as the slot and lug shown at 42 being employed to prevent rotation of the handle.

To the upper part of the sleeve 40, there is preferably affixed, as by solder, a socket 43, shouldered to rest upon the bracket arm 38. To retain the sleeve 40 and the socket 43 against inadvertent displacement, the lower end of the sleeve is threaded for a lock nut 44 which shoulders against the under face of the bracket arm 39. An insulating washer 45 is carried by the top end of the sleeve 40 and serves as an abutting means for the top cell 46 of a battery of three dry cells, the bottom cell 47 contacted from beneath by a pin 48, upwardly urged by a spring 49 resting on the plate 50. In turn, the plate 50 is contacted from beneath by a pin 51 connected to an electric conducting wire 52, the other wire 53 being soldered to a cap 54 carried by an intermediate member 55 threaded on the lower end of the sleeve 40. A bushing 56 is employed to insulate the member 55 from the pin 48, spring 49 and plate 50. An insert 57, also of insulating material, serves to insulate the pin 51 from the cap 54.

The wires 52 and 53 are preferably intertwined as shown, or encased in a woven cover, and their ends fitted into a plug 58 adapted to engage over the prongs 30, 32.

In instances where the cells are not provided with their own fiber outer tubes, it is essential to provide an inner lining of fiber for the sleeve 40 as shown at 59 to insulate the cells from said sleeve.

The lamp socket 43 is preferably provided with an encircling member 60 formed at 61 to provide a socket for a tongue (not shown) fixed to the reflector 62. The reflector may thereby be readily applied by inserting its tongue into the socket 61.

The ordinary screw socket is not suitable for use with flash lamps inasmuch as considerable time is required to insert and remove the lamp and since speedy insertion of the flash lamp is often necessary to catch a "shot" it is preferred to employ a coil spring 63, helically disposed as shown and having portions projecting into the socket 43 through the slotted openings 64. In this manner the plug 65 of the flash lamp 66 may be fitted into its socket merely by pushing downwardly until its central terminal contacts the central terminal of the top cell, the spring 63 finding the root of the plug thread to securely retain the assembly. Removal is effected by merely pulling upwardly on the flash lamp, the spring 63 against yielding to permit passage of the lands of the plug thread.

The circuit through the battery, lamp and connections is as follows:—Lamp plug shell 65, spring 63, socket 43, sleeve 40, member 55, cap 54, conductor 53, through the retarding mechanism, conductor 52, pin 51, plate 50, spring 49, pin 48, through the battery cells to the central terminal of the lamp plug.

It is not here necessary to show or describe in detail the mechanism linking the shutter with the priming lever and the shutter releasing means since they are well known. It is only necessary to take cognizance of the fact that the shutter may be operated only when the priming lever is cocked (Fig. 1) and that any means to prevent the priming lever returning to its initial position will prevent the operation of the shutter.

On the premise that 1/40 of a second is required to heat the flash filament and that the duration of the flash is 1/75 of a second, the retarding mechanism may be arranged to have the shutter open after the flash period commences and to have the shutter closed before the flash period is over. It is necessary, therefore, to make the flash circuit at least 1/40 of a second before the shutter opens so it may open during said flash period.

The mechanism here set forth is designed to operate in this manner and the screw 29 is preferably adjustable to insure the above timing or any timing that may be required.

In the present instance, Fig. 1 shows the parts with the priming lever cocked and the camera ready to snap a picture upon actuation of either member 12 or 13. It will be seen that the face 26 of the priming lever, by engaging the lug 25 of the contact spring, is holding the contactor 27 spaced from the screw 29 and that the pin 19 on the spring tensioned retarder overlies the ledge 21 but is spaced therefrom. Upon actuation of either shutter release means, the priming lever starts to swing upwardly until the ledge 21 contacts the pin 19. This first movement is sufficient to permit closing of the contact between 27 and 29. This is illustrated in Fig. 2 and at this instant the electrical circuit being complete, the flash is set off, it being borne in mind, however, that there is usually a lag of about 1/40 of a second before the flash ignites. The retarding action on the priming lever by engagement with the pin 19 is of infinitesimal duration but still sufficiently long enough to insure closing of the electrical circuit and igniting the flash before the retarder 16 is cammed to the position shown in Fig. 3 where the priming lever is free to move and thus allowing opening and closing of the shutter while the flash is on.

The pin 18 serves to partially rock the retarder when cocking the priming lever as the curved face 20 first engages it and then the pin 19 on its downward path. This is to prevent the face 26 from engaging the top of the pin 19 during the cocking motion of the priming lever.

From the foregoing it will be seen that a simple device for the purpose has been disclosed in the preferred form of its embodiment, but it is not desired to restrict the details to the exact construction shown, it being obvious that changes, not involving the exercise of invention, may be made without departing from the scope of the appended claims.

Having thus described my invention, what I claim as new and desire to secure by Letters Patent, is:

1. The combination of a camera comprising a shutter, operating mechanism for the shutter including shutter releasing means and a priming lever, a flash lamp and an electric ignition circuit connected thereto, and mechanical means coacting with the priming lever to retard it in its movement toward unlocked position whereby the opening of the shutter occurs after the ignition circuit is closed and the shutter is open during the flashing of the lamp.

2. The combination of a camera comprising a shutter, operating mechanism for the shutter including shutter releasing means and a priming lever, a flash lamp and an electric ignition circuit connected thereto, and mechanical means coacting with the priming lever whereby the opening of the shutter occurs after the ignition circuit is closed and the shutter is open during the flashing of the lamp, said mechanical means including a spring tensioned retarding member engaging a portion of said priming lever.

3. The combination with a camera having a shutter and operating mechanism for the shutter including shutter releasing means and a priming lever, of shutter retarding means comprising a pivoted retarding member, a projection on the retarding member, spring means to retain the projection in the path of travel of the cocked priming lever, a flash lamp, an ignition circuit therefor, and switch means controlled by the priming lever whereby the switch is closed upon initial movement from the cocked position of the priming lever and the retarding lever is rocked by subsequent movement thereof to permit the priming lever to seek its initial uncocked position.

4. In a device of the class described, mechanism to synchronize the opening of a shutter with the flash of a lamp comprising a shutter priming lever, a retarding member, a projection on said member adapted to be in the path of a portion of the priming lever when in a cocked position, and switch means for the ignition circuit of the flash lamp operatively associated with said priming lever.

5. In a camera having a high speed shutter, a shutter releasing means, a priming lever and a flash light source associated with the camera; the method of completing the circuit to the light source in advance of the maximum shutter opening, which consists in placing in the path of the priming lever in moving to its cocked position an electric switch whereby the priming lever in cocked position will maintain the switch in open circuit position, and in placing in the path of said lever in its movement to released position, a retarding means to delay the opening of a shutter whereby the maximum opening of the shutter will occur during the period of maximum illumination from the light source.

6. The combination with a camera having a shutter, operating means for the shutter including shutter releasing means in a priming lever, a flash lamp and an electric ignition circuit connected thereto, of a switch in said circuit, said switch being urged normally to circuit closing position and having a part contactable with a surface of the priming lever whereby when the lever is in cocked position it will retain said switch in open circuit position, and a priming lever retarding member, said member having a part contactable with another surface of the priming lever and normally in said lever's path toward its unlocked position and arranged to delay the lever's passage to said latter position.

HARRY GROGIN.